Figure 1:
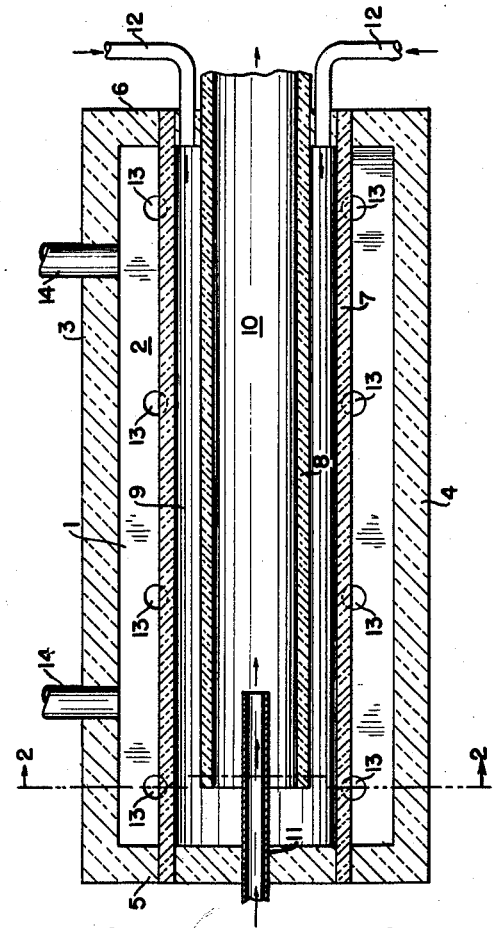

Dec. 1, 1959

C. W. SWEITZER 2,915,371

CARBON BLACK PROCESS

Filed June 10, 1955

INVENTOR
CARL W. SWEITZER
BY
Pennie, Edmonds, Morton, Barrows & Taylor
ATTORNEYS United States Patent Office 2,915,371
Patented Dec. 1, 1959

2,915,371

CARBON BLACK PROCESS

Carl W. Sweitzer, Garden City, N.Y., assignor to Columbian Company, New York, N.Y., a corporation of Delaware Application June 10, 1955, Serial No. 514,428

6 Claims. (Cl. 23—209.4)

This invention relates to the manufacture of carbon black by the decomposition of hydrocarbons and provides an improved continuous process for producing the black and also apparatus especially adapted to the carrying out of the process.

Carbon blacks of the prior art may be roughly classified in three groups, namely, impingement blacks, furnace blacks and thermal blacks. Each of these types of carbon black has highly desirable characteristics for its respective purpose, but is subject to certain limitation imposed by the manner in which it is produced.

Impingement blacks are produced by burning myriads of small flames beneath relatively cool, solid surfaces so that the flames impinge on the solid surfaces, depositing carbon black thereon which is periodically scraped off and collected. This type of operation gives a notoriously low yield.

The furnace blacks have been produced by partial combustion of hydrocarbons, as by burning a hydrocarbon with a restricted amount of air, or by mixing the hydrocarbon with preformed hot products of combustion. In these methods of operation, the carbon black is formed in the presence of a considerable proportion of water vapor and carbon dioxide which have been found substantially to affect the surface characteristics of the resultant black. Also the volume, temperature and composition of the hot diluent combustion gases are largely interdependent and, particularly the temperature and volume of the diluent gases resulting from partial combustion of the hydrocarbons, are dependent on the proportions of hydrocarbon burned.

In the production of thermal blacks, the hydrocarbon is decomposed by passing it, diluted to a greater or less extent, in contact with hot surfaces, as disclosed, for instance in Patent No. 1,880,512 to Elwood B. Spear. This thermal type of black has been generally characterized by relatively low oil absorption properties and it is primarily that general type of carbon black to which the present invention relates.

The Spear patent just noted discloses a large chamber filled with refractory checkerwork which is intermittently heated to the required temperature and, during the intervening periods, the hydrocarbon to be decomposed is passed through the hot checkerwork and decomposed by heat absorbed from the hot surfaces.

These thermal black processes have been subject to the disadvantage that the apparatus is in productive operation for only a portion of the time and to the further disadvantage that a considerable proportion of the carbon black formed is deposited in the checkerwork and lost. This type of operation has been subject to the further disadvantage that the carbon black thus formed is of relatively coarse particle size, usually not less than about 150 m$\mu$ mean particle diameter, which has been found objectionable for some purposes.

To avoid the intermittent nature of such operations, attempts have been made to decompose the hydrocarbons to carbon black by passing them through externally heated tubes. Such attempts have heretofore resulted in carbon black of inferior quality and also excessive amounts of carbon or coke have been deposited on the inner walls of the tube, resulting in poor yields and necessitating frequent shut-downs for cleaning the apparatus.

The present invention provides an improved continuous process especially adapted to the production of carbon blacks having the relatively low oil absorption properties, characteristic of the thermal blacks, but having mean particle diameters of a much lower order than that of the previously known thermal blacks. By my new method, I can obtain excellent yields of carbon black, of fine and exceptionally uniform particle size. The process has the further advantages that the hydrocarbons are decomposed while highly dispersed in an inert gas, substantially free from water vapor, carbon dioxide or other oxidizing gas which might tend to modify the surface characteristics of the black or lower the yield by combustion, that the temperature, volume, and composition of the diluent gas may be readily and independently controlled, and that the process may be carried out in compact relatively inexpensive apparatus without coking the walls of the reaction chamber.

In carrying out the process of my invention, the hydrocarbons to be decomposed, are dispersed in the inert gas at a temperature in excess of that at which the hydrocarbons are decomposed, to carbon black, and the mixture continuously passed through an externally heated elongated reaction chamber, advantageously in the form of an elongated tube. In passing through this reaction tube, the hydrocarbon is decomposed, predominately by heat absorbed from the hot gases, to form carbon black in suspension in the hot gases and the gaseous suspension is continuously withdrawn from the downstream end of the tube and passed to conventional apparatus for separating and collecting the carbon black.

In order to avoid excessive deposition of carbon on the inner wall of the reaction tube and to avoid overheating the reaction mixture adjacent the wall of the tube, I maintain the wall of the reaction tube at a temperature below that of the hydrocarbon suspension passing through the tube. I may accomplish this, with advantage, by indirectly heating the reaction tube from an external source uniformly spaced from the outer walls of the reaction tube and extending over the length of the tube and passing the inert gas, prior to mixing with the hydrocarbon, through the space between the source of heat and the reaction tube in heat exchange relation with the heating source and with the outer surface of the reaction tube and so correlating the intensity of the heat given off by the heating source and the volume and rate of flow of the inert gas in contact therewith as to heat the inert gas to a temperature substantially in excess of that of the inner wall of the reaction tube.

The process may, with advantage, be carried out, for instance, in apparatus comprising two concentric tubes of refractory heat-conducting material and extending through a suitable heating furnace, the innermost tube being the reaction tube and the tubes being spaced apart to form an annular chamber extending over the length of the reaction tube. The wall of the outer tube is uniformly strongly heated by the furnace and heat is uniformly transmitted therefrom to the wall of the inner tube, while the inert gas is continuously passed longitudinally through the annular chamber, thus protecting the wall of the reaction tube against excessive temperature rise. A stream of the hydrocarbon is continuously mixed with the preheated inert gas and the mixture passed longitudinally through the reaction chamber constituting the inner tube of the apparatus just described.

Since the diluting gases are at a higher temperature than the walls of the reaction chamber, the heat required for the decomposition of the hydrocarbon is thus transmitted to the hydrocarbon predominately by a gas-to-gas heat transfer, as distinguished from the solid-to-gas heat transfer of the prior art thermal decomposition process. The amounts of hydrocarbon and inert gas mixed to form the dispersion are so proportioned, with respect to the temperature of the inert gas, that the temperature of the resultant mixture will be sufficiently high to decompose the hydrocarbon and will exceed that of the inner wall of the reaction chamber.

Figure 2:
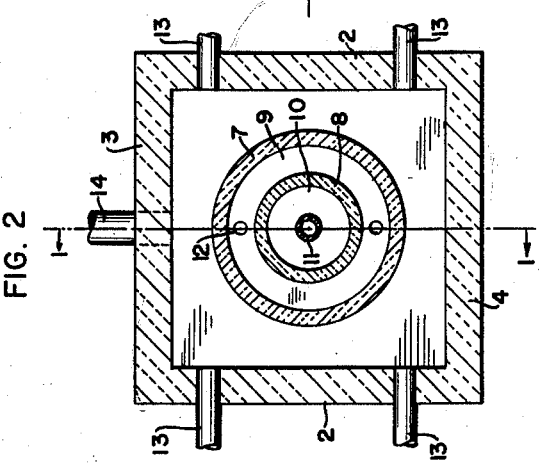

The invention will be further described and illustrated with reference to the accompanying drawings which represent somewhat conventionally and diagrammatically, apparatus especially adapted to the carrying out of the process and of which Figure 1 is a sectional view of the apparatus along the line 1—1 of Figure 2; and Figure 2 is a sectional transverse view of the apparatus along the line 2—2 of Figure 1.

Referring to the drawing, a horizontally elongated furnace chamber 1 of rectangular section is delineated by side walls 2, roof wall 3, lower wall 4, front end wall 5 and rear end wall 6.

Extending entirely through the furnace chamber longitudinally is a refractory heat-conducting tube 7, and coaxially positioned within tube 7 is a second refractory heat-conducting tube 8 spaced from the walls of tube 7 a substantial distance to form an annular chamber 9.

Leading into the front end of the tubular chamber 10, which constitutes the reaction chamber, there is a conduit 11 adapted to inject into the chamber the hydrocarbons to be decomposed.

The annular chamber 9 is in open communication at one end with the front end of the reaction chamber 10. Conduits 12 leading into the opposite end of the annular chamber 9 are adapted to the introduction of the inert gas to that chamber.

Extending through the opposite side walls of the furnace chamber at about level with the upper and lower edges, respectively, of tube 7, there are provided fuel burners indicated at 13. A flue for carrying off the effluent furnace gases is indicated at 14.

In operation, combustible mixtures may be supplied to the furnace chamber by burners 13 and burned within the chamber for heating the wall 7. More advantageously, the burners 13 are of the Maxon gas burner type adapted to the generation of combustion gases of extremely high temperatures which are injected into the furnace chamber at high velocity. In using burners of this type, it is particularly desirable to position the burners at one side of the furnace at a level near the top of the furnace chamber and those on the opposite side at a level near the lower end of the chamber so as to create within the chamber a mass of hot gases whirling about, and in contact with, the outer surface of wall 7. However, any type or arrangement of burners adapted to heat the wall 7 to the necessary temperature may be used. An effluent flue 14 is, with advantage, positioned at each end of the furnace chamber. However, the size, number and position of these effluent flues is not critical so long as they are of adequate capacity to avoid excessive pressure build-up within the chamber.

By the means just described, the wall of tube 7 is heated to an extremely high temperature, generally in excess of 2500° F. and preferably substantially above that temperature. Accordingly, the tube 7 should be fabricated of silicon carbide, or similar refractory material, which is a good heat conductor and is adapted to withstand such high temperatures and thermal shock.

The inert gas with which the hydrocarbon is to be diluted is injected into the annular chamber 9 through conduits 12 and flows through the chamber in contact with the highly heated wall 7 and between that wall and the tubular wall 8 of the reaction chamber. In passing through the annular chamber, the inert gas is heated by contact with the walls 7 and 8 to a temperature in excess of that required to decompose the hydrocarbon, and at the far end of the annular chamber reverses its direction and flows backwardly through the reaction chamber 10.

As these hot inert gases enter the chamber 10, they are rapidly and uniformly mixed with the hydrocarbon to be decomposed which is introduced through the tube 11. The hydrocarbons are thus diluted and heated, predominately by heat absorbed from the hot gases, to a temperature in excess of their decomposition temperature. As the mixture continues through the reaction chamber, the hydrocarbons are decomposed to form carbon black in suspension, the suspension passing from the downstream end of the reaction chamber to conventional apparatus for separating and collecting the carbon.

The invention is especially useful in the decomposing of methane to carbon black. However, in place of methane, or in conjunction therewith, I may use any other normally gaseous hydrocarbon, or any normally liquid hydrocarbon which can be vaporized without excessive coking.

As the inert diluent gas, I have used nitrogen with particular advantage, especially where the hydrocarbon consists essentially of methane. However, other inert gases, for instance, flue gases which have been stripped of their oxidizing components, water vapor, free oxygen and $CO_2$, may be employed. For instance, I have, with advantage, used a mixture of 78% nitrogen, 10% carbon monoxide and 12% hydrogen, i.e. simulated flue gas from a carbon black furnace stripped of its oxidizing components. Such diluent gases may be used, with considerable advantage, and, for the purpose of the present invention, may be considered to be inert. Reference herein, and in the appended claims, to inert gas will be understood to designate a gas substantially free from water vapor, $CO_2$ and free oxygen.

The extent of dilution of the hydrocarbon is subject to considerable variation depending largely upon the desired fineness of the resultant carbon black. In decomposing methane, for instance, I have, with particular advantage, used proportions of diluent nitrogen to methane varying over a range of 6:1 to 16:1 by volume, calculated under normal conditions of temperature and pressure, resulting in the conversion of 40% to 50% of the methane to carbon black. Similar proportions of other inert diluent gases may be used either with methane or other hydrocarbon gas or vapor.

The reaction temperature, i.e., the temperature of the gaseous mixture passing through the reaction chamber, is likewise subject to considerable variation depending on the hydrocarbon used and the product desired. However, for presently preferred results, I have, with particular advantage, used reaction temperatures within the range of 2500° F. to 2850° F. This temperature range has been found particularly advantageous where methane is used as the hydrocarbon to be decomposed as it has been found to result in a carbon black having especially desirable characteristics, including uniform fineness and low oil absorption, in yields up to 13–16 pounds per thousand cubic feet of methane.

The yields of carbon black obtained by my process are primarily dependent upon operating temperatures and ordinarily these temperatures should be such as to insure the most efficient decomposition of the particular hydrocarbon to the desired end product, i.e. carbon black, since any hydrocarbon not decomposed to carbon black is lost, either as unchanged or as polymerized hydrocarbons. So long as the wall of the reaction chamber is maintained at a temperature below that of the hydrocarbon suspension passing in contact therewith, the loss of carbon or hydrocarbon due to coking on the walls is minimized regardless of the reaction temperature. Further no carbon or hydrocarbon is lost by combustion.

Therefore, it is usually desirable to operate at the maximum temperature attainable within the limits of endurance of the furnace refractories. At temperatures in excess of 2850° F., yields of carbon black can be further increased but such higher temperatures have not been commercially practical with currently available furnace refractories. Increasing the time period during which the hydrocarbon is maintained at the elevated temperature likewise tends to increase yields.

In the operation described, as previously noted, heat is transmitted by radiation from the wall 7 to the wall 8 of the reaction chamber. But a considerable proportion of this heat is imparted by convection to the inert gases flowing in contact therewith and, accordingly, the wall 8 is continuously being cooled, and by careful temperature control it is readily possible to heat the inert gas to a temperature substantially in excess of that of the inner surface of wall 8, so that when mixed with the hydrocarbon, the temperature of the mixture will exceed that of wall 8.

The temperature of wall 8 may be adjusted to that desired by raising or lowering the furnace temperature, or by regulating the volume or inert gas, or by preheating or cooling the inert gas before it is introduced into the annular chamber, or by any combination of these adjustments. The temperature of the inert gas, just prior to mixing with the hydrocarbon, may be varied either by increasing or decreasing the volume of inert gas passed through the annular chamber, or by raising or lowering, the furnace temperature, or by preheating or cooling the inert gas before its introduction into the annular chamber, or any combination of these adjustments. The temperature of the mixed gasses passing through the reaction chamber may be controlled by controlling the temperature of the inert gas prior to mixing with the hydrocarbon, or by varying the proportion of inert gas mixed with the hydrocarbon, or by preheating the hydrocarbon to a greater or less extent prior to mixing with the inert gas. However, in the latter case, care should be taken to avoid preheating the hydrocarbon to a temperature at which carbon-forming decomposition might occur in the injection tube 11.

By the procedure described, a substantially uniform amount of heat may be transmitted to the walls 8 throughout the entire length of the reaction chamber. The heating of the walls 8 is not dependent on heat absorbed from the reacting mixture passing through the chamber and therefore the apparatus described may be quickly brought to operating conditions without the production of large amounts of off-grade carbon black during a prolonged starting-up period.

Where the hydrocarbon is one which decomposes with the absorption of heat, there may be a noticeable drop in the temperature of the hot gases as they pass through the reaction chamber. However, by reason of my novel method of heating the wall of the reaction chamber, a comparable temperature gradient may be readily established along the wall of the reaction chamber as by introducing a relatively cool, inert gas through the tubes 12 and thus absorbing a proportionately larger amount of heat from the wall along the lower end of the reaction chamber. By thus independently heating the wall of the chamber, heat losses from the reaction mixture passing through the chamber is substantially reduced.

Though I have described and illustrated the invention by an embodiment thereof comprising a single reaction unit, it will be understood that, where increased capacity is desired, a plurality of concentric tubes 7 and 8 may be used, either in a single furnace or in separate furnaces. For most advantageous results, the reaction tube diameter should not exceed about 5 inches (I.D.) nor be less than about 2 inches and the reaction tube should be spaced from the inner wall of tube 7 a distance not exceeding about 3 inches nor less than about 1 inch. The thickness of the wall of the reaction tube is preferably within the range of ¼ to 2 inches, usually about ¾ inch.

The length of the reaction chamber is subject to considerable variation and will depend primarily upon the predetermined reaction temperature and velocity at which the hydrocarbon mixture is to be passed therethrough, the velocity and length of the tube being functions of the time factor.

The invention will be further illustrated by means of the following specific examples of operations carried on in apparatus substantially as illustrated, in which the tube 7 was a Carbofrax tube 76 inches long, 3 inches I.D. and 4½ inches O.D., extending entirely through a gas fired furnace equipped with 8 Maxon burners and the tube 8 was an Alundum tube 60 inches long, 1⅞ inches I.D. and 2¼ inches O.D.; and the diameter of tube 11 was ¼ inch I.D. A thermocouple was positioned well within the furnace chamber alongside tube 7 for measuring the furnace temperature.

In each of the following runs, the hydrocarbon decomposed was methane and the inert gas was nitrogen. Operating data, yields and characteristics of the resulting carbon black are set forth in the following tabulations:

| Run # | I | II | III | IV | V |
|---|---|---|---|---|---|
| Furnace Temp., ° F | 2,750 | 2,840 | 2,490 | 2,520 | 2,855 |
| Nitrogen, cu. ft./hr | 110 | 110 | 110 | 137 | 137 |
| Methane, cu. ft./hr | 18 | 18 | 18 | 9 | 9 |
| Yield, lbs./1,000 cu. ft. methane | 14.5 | 16.2 | 10.7 | 11.9 | 14.5 |
| Properties of black: | | | | | |
| ABC Color Index | 140 | 145 | 67 | 102 | 152 |
| Mean particle diameter, m$\mu$ | 33 | 31 | 88 | 49 | 29 |
| Oil absorption, gals./100 lbs. of black | 4.9 | 6.1 | 7.6 | 6.0 | 6.6 |
| Acetone Extractable, percent | 0.32 | 0.57 | 4.43 | 2.06 | 0.29 |

Similar runs were made in the same apparatus, using as the inert gas a simulated flue gas stripped of water vapor and carbon dioxide, under the conditions and with the results set forth in the following tabulation.

| Run # | VI | VII | VIII |
|---|---|---|---|
| Furnace Temp., ° F | 2,735 | 2,760 | 2,770 |
| Flue Gas, cu. ft./hr | 125 | 125 | 125 |
| Methane, cu. ft./hr | 18 | 18 | 18 |
| Yield, lbs./1,000 cu. ft. methane | 13.1 | 13.7 | 13.7 |
| Properties of black: | | | |
| ABC Color Index | 147 | 145 | 153 |
| Mean particle diameter, m$\mu$ | 31 | 31 | 29 |
| Oil absorption, gals./100 lbs. of black | 6.0 | 5.5 | 5.5 |
| Acetone Extractable, percent | less than 0.5% | | (clear) |

The mean particle diameter of the black is dependent primarily upon the proportions of hydrocarbon and inert diluent gas used, but may also be varied by varying the operating temperature, particle size being decreased by an increased proportion of the diluent gas and also by raising the operating temperature.

It will be understood, as previously noted, that the process may be carried out in apparatus other than that specifically illustrated herein. For instance, instead of the coaxial tubes shown in the drawing, the reaction chamber may be of rectangular section. Also the inert gas may be heated independently of the means by which the reaction chamber is heated and may be directed lineally into the reaction chamber, the hydrocarbon to bed decomposed being injected into the reaction chamber either lineally, as shown in the drawing, or through injection tubes extending through the side wall of the chamber near the upstream end thereof.

I claim:

1. A continuous process for thermally decomposing hydrocarbons to carbon black which comprises indirectly heating the outer surface of a heat-conducting unobstructed reaction tube from an external source of heat uniformly spaced from, and extending about, the longitudinal wall of the tube, continuously passing an inert gas longitudinally through the space between the source of heat and the reaction tube in heat exchange relation with the source of heat and with the outer wall of the reaction tube, and thereby heating the inert gas to a temperature in excess of that at which the hydrocarbon is decomposed to carbon black, directly passing the preheated inert gas through the reaction tube, continuously injecting a stream of the hydrocarbon to be decomposed into the stream of hot inert gas passing through the reaction tube and rapidly dispersing the hydrocarbon in the hot gas stream, and thereby decomposing the hydrocarbon to form carbon black in gaseous suspension predominantly by heat absorbed from the hot inert gases while avoiding coking of the hydrocarbon on the chamber walls, passing the suspension from the downstream end of the reaction tube and seperating and collecting the carbon black.

2. The process of claim 1 in which the dispersion of the hydrocarbon in the hot inert gases is passed through the reaction tube at a temperature in excess of 2500° F.

3. The process of claim 1 in which the inert gas is nitrogen.

4. The process of claim 1 in which the inert gas is a flue gas stripped of its water vapor, free oxygen and $CO_2$ components.

5. The process of claim 3 in which the hydrocarbon to be decomposed consists essentially of methane and is mixed with the nitrogen in proportions within the range of 1:6 to 1:16, by volume.

6. The process of claim 1 in which the hydrocarbon is preheated to a temperature below its decomposition temperature before being mixed with the hot inert gas.

References Cited in the file of this patent

UNITED STATES PATENTS

| | | |
|---|---|---|
| 986,489 | Morehead | Mar. 14, 1911 |
| 2,062,358 | Frolich | Dec. 1, 1936 |
| 2,498,444 | Orr | Feb. 21, 1950 |
| 2,700,598 | Odell | Jan. 25, 1955 |
| 2,773,744 | Antonsen | Dec. 11, 1956 |
| 2,785,053 | Larson et al. | Mar. 12, 1957 |

UNITED STATES PATENT OFFICE

CERTIFICATE OF CORRECTION

Patent No. 2,915,371 December 1, 1959

Carl W. Sweitzer

It is hereby certified that error appears in the above numbered patent requiring correction and that the said Letters Patent should read as corrected below.

In the grant, lines 2 and 12, and in the heading to the printed specification, lines 3 and 4, name of assignee, for "Columbian Company", each occurrence, read -- Columbian Carbon Company --.

Signed and sealed this 12th day of July 1960.

(SEAL)
Attest:

KARL H. AXLINE
Attesting Officer

ROBERT C. WATSON
Commissioner of Patents